United States Patent [19]
Hymer

[11] Patent Number: 5,462,398
[45] Date of Patent: Oct. 31, 1995

[54] MOTORCYCLE CARRIER

[76] Inventor: Robert F. Hymer, Rte. 11, Box 2433, Lexington, N.C. 27292

[21] Appl. No.: 180,133

[22] Filed: Jan. 11, 1994

[51] Int. Cl.⁶ ..................................................... B60P 3/07
[52] U.S. Cl. ............................................... 414/462; 414/537
[58] Field of Search ................................. 414/462, 537; 224/42.08; 280/515

[56] References Cited

U.S. PATENT DOCUMENTS

| | | | |
|---|---|---|---|
| 2,925,287 | 2/1960 | Morris | 280/515 |
| 3,348,713 | 10/1967 | Will | 214/450 |
| 3,528,578 | 9/1970 | Schoenberger | 414/462 |
| 3,529,737 | 9/1970 | Daugherty | 214/450 |
| 3,586,188 | 6/1971 | Cambell | 414/462 |
| 3,591,029 | 7/1971 | Coffey | 214/450 |
| 3,720,333 | 3/1973 | Daughn | 214/450 |
| 3,724,694 | 4/1973 | Wilson | 214/450 |
| 3,731,830 | 5/1973 | Long | 214/450 |
| 3,760,965 | 9/1973 | Chandler | 414/462 |
| 3,796,333 | 3/1974 | Goldstein | 214/450 |
| 3,805,984 | 4/1974 | Schwarz et al. | 214/450 |
| 3,837,513 | 9/1974 | Adamek | 414/462 |
| 3,843,001 | 10/1974 | Willis | 414/462 |
| 3,912,098 | 10/1975 | Nicotra | 224/450 |
| 3,913,811 | 10/1975 | Spencer | 224/42.08 |
| 3,921,842 | 11/1975 | Campbell | 214/450 |
| 4,640,658 | 2/1987 | Webb | 414/462 |
| 4,705,488 | 11/1987 | Mungons | 414/462 |
| 4,733,810 | 3/1988 | Graber et al. | 414/462 |
| 5,122,024 | 6/1992 | Stokes | 414/537 |
| 5,145,308 | 9/1992 | Vaughn et al. | 414/537 |
| 5,325,558 | 7/1994 | Labreche | 414/537 |

FOREIGN PATENT DOCUMENTS 1580685  12/1980  United Kingdom ............... 414/462

OTHER PUBLICATIONS

"Dirt Rider" Magazine; Jun. 1992; pp. 113 and 115's Advertisements.

Primary Examiner—Michael S. Huppert
Assistant Examiner—Thomas J. Brahan
Attorney, Agent, or Firm—Rhodes, Coats, Bennett

[57] ABSTRACT

A motorcycle carrier for carrying a motorcycle on a vehicle having a hitch, comprising a support arm detachably secured to the hitch of the vehicle and a ramp assembly for supporting the motorcycle. The ramp assembly includes a platform having a first end and a second end which extends continuously from the first end to the second end. The platform is configured to receive and support the wheels of the motorcycle. The ramp assembly is supported by the support arm between the first end and the second end and is pivotally coupled with same by a removable coupling. The motorcycle carrier may further include a stabilizer bar which is detachably secured to the support arm and configured such that when a motorcycle is transported on the carrier, the stabilizer bar aids in reducing any movement of the motorcycle during transport. In the preferred embodiment, the carrier may be reversibly mounted for loading and unloading the motorcycle from either side of the vehicle.

10 Claims, 3 Drawing Sheets

MOTORCYCLE CARRIER

FIELD OF THE INVENTION

The present invention is directed to a vehicle carrier, and, more particularly, to an automobile hitch mounted motorcycle carrier.

BACKGROUND OF THE INVENTION

It is often necessary to transport motorcycles by mounting them on or pulling them behind automobiles or other vehicles (hereinafter referred to generally as vehicles). This is especially true for off-road or dirt bikes, many of which are not street legal and/or are uncomfortable for long distance riding. Most apparatus for transporting motorcycles falls into one of two categories: trailers and carriers. In general, trailers have wheels and carriers do not. Trailers have drawbacks in that they are generally bulky, difficult to store in most vehicles, and tend to be unstable when pulled at high speed.

Several carriers have been developed in an attempt to mitigate or overcome the disadvantages of trailers. Such carriers are disclosed in the following patents: U.S. Pat. Nos. 3,348,713 to Will; U.S. Pat. No. 3,529,737 to Daugherty; U.S. Pat. No. 3,591,029 to Coffey; U.S. Pat. No. 3,720,333 to Vaughn; U.S. Pat. No. 3,724,694 to Wilson; U.S. Pat. No. 3,731,830 to Long; U.S. Pat. No. 3,796,333 to Goldstein; U.S. Pat. No. 3,805,984 to Schwartz et. al.; U.S. Pat. No. 3,910,098 to Nicrotra; U.S. Pat. No. 3,913,811 to Spencer; U.S. Pat. No. 3,921,842 to Campbell; U.S. Pat. No. 4,189,274 to Schaffer; U.S. Pat. No. 4,234,284 to Hauff; U.S. Pat. No. 4,275,981 to Bruhn; U.S. Pat. No. 4,815,638 to Hutrya; and U.S. Pat. No. 4,934,894 to White.

All of the above-listed carriers have disadvantages in that they require complex mounting or operating means, do not provide for easy loading and unloading of a motorcycle, and/or they do not adequately secure the motorcycle.

The motorcycle carriers of the above-mentioned prior art mount transversely to the length of the vehicle. If may happen that, when a vehicle is parked for loading or unloading, there is an obstruction or a hazard on one side of the vehicle, such as a curb or traffic. In such situations, it is advantageous to be able to load or unload the motorcycle from the direction of the safer or unobstructed side of the vehicle. Prior art patents addressing the aforementioned problem include U.S. Pat. No. 4,234,284, U.S. Pat. No. 3,348,713 and U.S. Pat. No. 3,724,694. All of these patents solve the problem by providing a platform that may be rotated in either direction. A significant drawback of these designs is that both ends of he platform must be suitable for rolling the motorcycle onto and off of. Hence, a rigid, non-detachable bracing means generally cannot be implemented on either end of the platform.

Thus, there exists a need for a motorcycle carrier which is simply mountable and which can be easily stored. Further, there exists a need for such a motorcycle carrier which provides for convenient and reversible loading and unloading of a motorcycle thereon. In addition, there exists a need for a motorcycle carrier having integral means for firmly securing a motorcycle.

SUMMARY OF THE INVENTION

The present invention is directed to a motorcycle carrier adapted to be mounted on a conventional class III hitch. The motorcycle carrier has a channel track or platform designed to hold the tires of a medium to small-sized two-wheeled vehicle. A fixed front brace or support is provided at one end of the platform for holding the front wheel. The front brace cradles the front wheel and serves to keep the motorcycle from rolling forward or leaning to either side. A detachable rear brace is provided near the end of the platform opposite the front brace. The rear brace keeps the motorcycle from rolling backwards or leaning to either side. The rear brace can be detached from a holding position on the platform and remounted on the end of the platform in a loading position. When mounted in this fashion, the rear brace serves as a ramp which effectively extends the length of the platform and provides easy loading and unloading.

The platform is supported by a support arm which includes a pivot mount and a hitch mount. The hitch mount is designed to be inserted into a class III hitch and to support the aforementioned components. The pivot mount supports the middle of the platform. The pivot mount has tabs extending horizontally from each side. A first lock pin inserted through a sleeve on the platform and through the tabs on one side of the pivot mount allows the platform to pivot in a plane perpendicular to the support tube. The platform includes a bracket extending downwardly on the other side of the pivot mount. A second lock pin couples the bracket and the tabs on that side of the pivot mount and thereby keeps the platform from pivoting. When the platform is pivoted into a loading position and the rear brace is in the loading position, a portion of the rear brace has substantially the same slope as the platform and another portion is flush with the ground. The pivot mount is designed such that the platform may be mounted for loading and unloading on either side of the vehicle.

An optional enhancement to the motorcycle carrier described above is a stabilizer. The stabilizer is a rigid C-shaped bar. One leg of the bar engages the end of the hitch mount. A connecting leg of the C-shaped bar extends upwardly from the pivot mount, and the third leg of the stabilizer supports the motorcycle underneath its bump plate frame or engine.

DESCRIPTION OF THE PREFERRED EMBODIMENT

Figure 1:
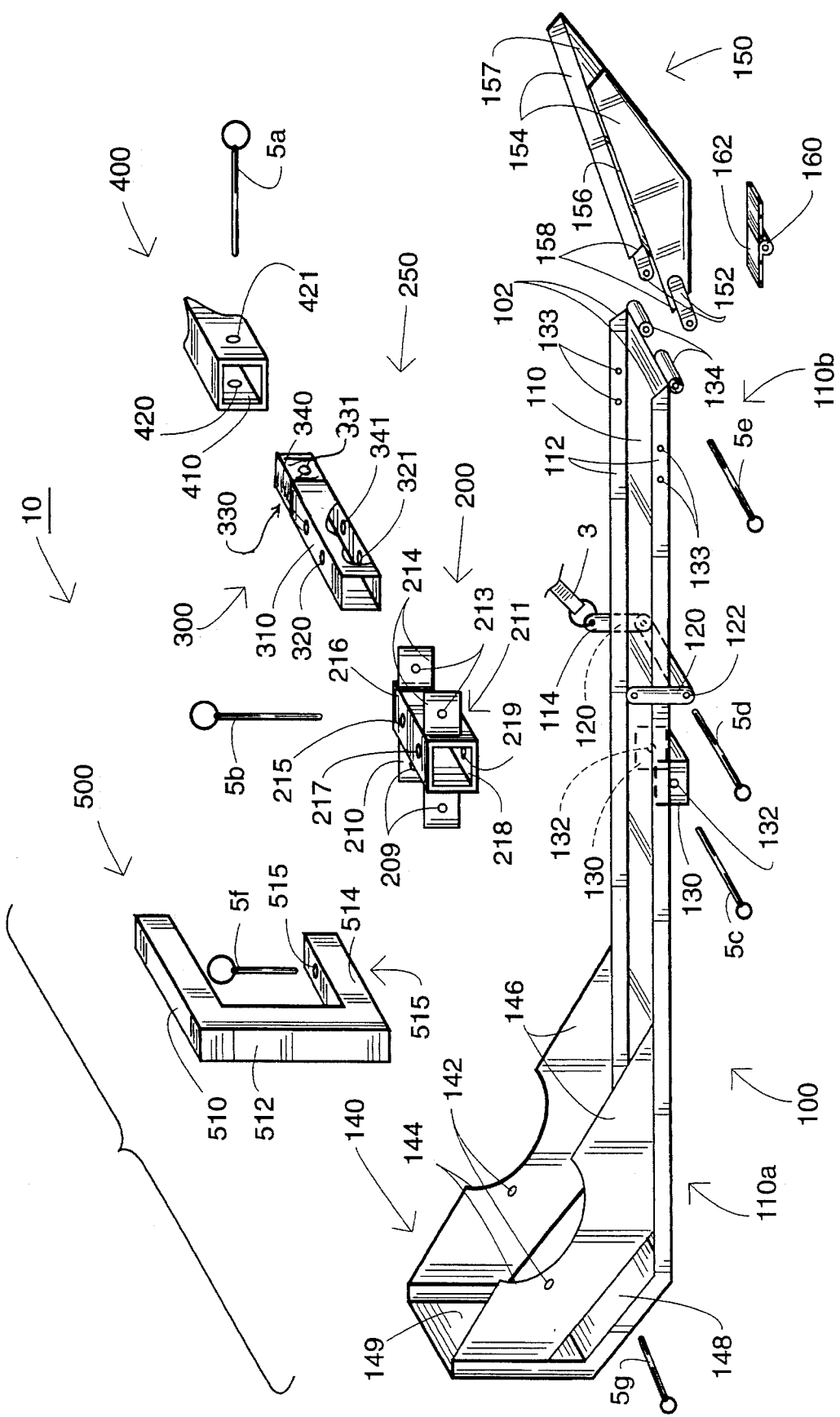
FIG. 1 is an exploded perspective view of the motorcycle carrier of the present invention.

In the following description, like referenced characters designate like or corresponding parts throughout the several views. Also in the following description, it is to be understood that such terms as "front", "rear", "back", "left", "right", "upwardly" "downwardly", "first" "second" and the like are words of convenience and are not to be construed as limiting terms.

Referring now to the drawings in general, it will be understood that the illustrations are for the purpose of describing a preferred embodiment of the invention and are not intended to limit the invention thereto.

A preferred embodiment of the motorcycle carrier of the present invention is shown in FIG. 1 and is generally denoted by the numeral 10. Motorcycle carrier 10 includes ramp assembly 100, support arm 250, and stabilizer 500. Support arm 250 further includes hitch mount 300 and pivot mount 200. Motorcycle carrier 10 preferably is designed to engage conventional class III automobile hitch 400. It will be understood that motorcycle carrier 10 may be designed to engage any type of conventional automobile hitch.

Motorcycle carrier 10 may be formed from rigid metal or any other suitable material. Preferably, the carrier will be formed of stamped 3/16 to 1/4 inch thick steel and welded two-inch square steel tubing, depending on the component. The lock pins hereinafter referenced are preferably of the type having a pull ring on one end and a hole formed in the opposite end for receiving a padlock or the like. However, it will be understood that any suitable securing means may be utilized.

Hitch 400 comprises a tube having opening 410. A pair of lock pin holes 420,421 are formed in the sides of hitch 400. Hitch mount 300 comprises a rigid tube 310 configured to fit within hitch 400. The length of hitch mount 300 will vary and will typically range from 18 to 24 inches. A pair of holes 320,321 is formed in the top and bottom sides at one end of tube 310. A second pair of holes 330,331 (hole 330 is obscured in the figures) are formed in the sides of tube 310 at the other end. Motorcycle carrier 10 is mounted to hitch 400 by sliding hitch mount 300 into hitch 400 such that holes 330 and 420 and holes 331 and 421 are aligned and inserting lock pin 5a through all four holes.

The following discussion describes carrier 10 as mounted in the figures, that is, as mounted for loading and unloading to the right side of the vehicle. As is discussed hereinafter, carrier 10 is reversible so that it may be mounted for loading and unloading from the left side as well.

Pivot mount 200 includes tube 216 which defines an opening 218 which is configured to receive tube 310. Preferably, tube 310 is about 8 to 10 inches long. Tube 216 has pairs of holes 215,211 (hole 211 is obscured in FIG. 1) and 217,219 formed in the top and bottom at each end. Notably, pivot mount 200 is axially symmetric. It will be appreciated that the pivot mount could also be designed to be longitudinally symmetric. Pivot mount 200 is mounted on hitch mount 300, and thereby mounted on hitch 400 and the associated vehicle, by sliding tube 216 over tube 310 such that holes 320,321 are aligned with holes 211,215 and then inserting lock pin 5b through the aligned holes. It will be understood that hitch mount 300 may be formed integrally with pivot mount 200.

Tube 216 has a U-shaped bracket 210 extending laterally from its left side. U-shaped bracket 210 has a pair of holes 209 formed therein. Tabs 214 extend laterally from the right side of tube 216 and have holes 213 formed therein. Tabs 214 are spaced apart such that they may receive tabs 120 (discussed below) and brace the same from lateral movement while allowing rotational movement. As will be described more fully hereinafter, tabs 214 form a first hinge element which is pivotally coupled by means of a coupling (lock pin 5d) with a second hinge element (sleeve 122).

Ramp assembly 100 includes platform 110 which has first and second ends 110a, 110b. The preferred dimensions of platform 110 will depend on the length of the motorcycle to be supported and the width of its tires and will typically be in the range of 65 to 96 inches long and 2 to 6 inches wide. Sidewalls 112 are formed along the edges of platform 110 and serve to keep the tires of a motorcycle loaded on carrier 10 from sliding sideways off of platform 110. Sidewalls 112 will preferably have a height of about 2 inches. Edges 102 of sidewalls 112 at second end 110b are formed at approximately a 45 degree angle relative to platform 110.

Front brace 140 is formed at the first end of platform 110 and is designed to secure the front wheel of a loaded motorcycle. Front brace 140 includes front walls 148,149 and side rails 146. Cut-outs 144 are formed in side rails 146 to accommodate the brakes of the motorcycle. Holes 142 are also formed in side rails 146. Lock pin 5g may be inserted through holes 142 and the spokes of the front wheel for securing the same.

U-shaped bracket 130 extends downwardly from the bottom surface of platform 110. U-shaped bracket 130 has holes 132 formed therein and is designed such that it may be received by U-shaped bracket 210 of pivot mount 200 without binding. Tabs 120 extend downwardly from the bottom surface of platform 110. Tabs 120 support a sleeve 122 joined thereto. Sleeve 122 is positioned such that when holes 132 of U-shaped bracket 130 are aligned with holes 209, sleeve 122 is aligned with holes 213 and is disposed between tabs 214. Sleeves 134 are formed at the second end 110b of platform 110. Holes 133 are formed in opposed pairs in sidewalls 112 near the second end of platform 110.

Figure 2:
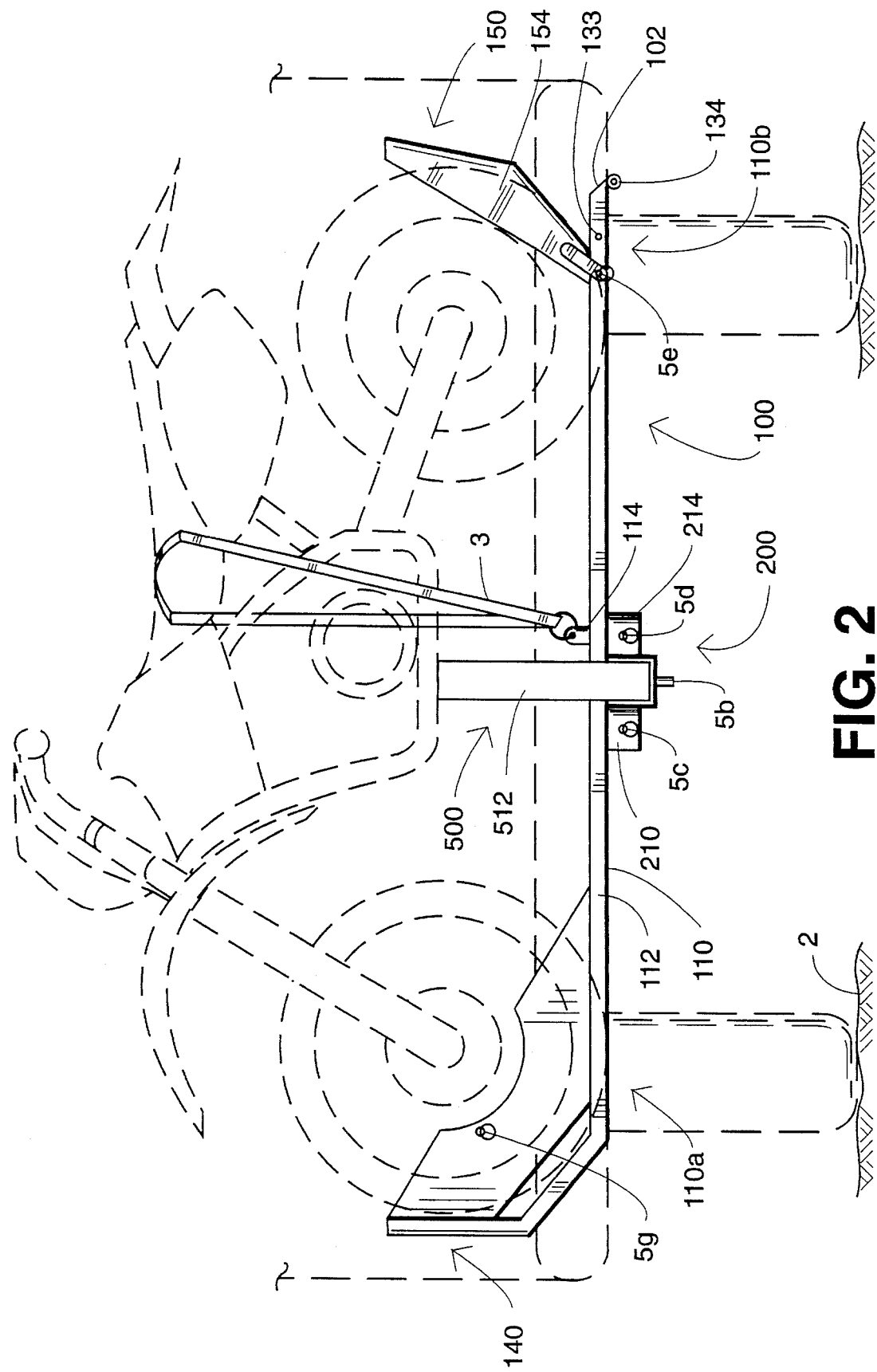
FIG. 2 is a side elevational view of the motorcycle carrier of the present invention shown mounted on a vehicle, the vehicle being shown in dashed lines, in a transporting position with a loaded motorcycle shown thereon in dash lines.

Ramp assembly 100 also includes rear brace 150. Rear brace 150 has first and second platforms 156,157 aligned end-to-end and disposed at an angle to one another. Platforms 156,157 have a pair of sidewalls 154 extending upwardly from each side. Sidewalls 154 each have an apertured tab 152 extending from the one end thereof. Edges 158 of sidewalls 154 are preferably formed at a 135 degree angle relative to platform 156. Sleeve 160 and flange 162 extend outwardly to the left from underneath platform 156 and may be formed integrally with the same or welded or otherwise attached thereto. Sleeve 160 and tab 162 are shown apart from platform 156 in FIG. 1 for clarity. In FIG. 2, sleeve 160 and tab 162 are obscured by sleeve 134 and sidewall 112, respectively.

Rear brace 150 may be mounted in either of two ways on the second end 110b of platform 110, depending on the application.

Rear brace 150 will serve to secure the rear wheel of a motorcycle when mounted in a transporting position as shown in FIG. 2. Rear brace 150 is mounted in the transporting position by inserting lock pin 5e through apertured tabs 152 and a pair of opposed holes 133 formed in sidewalls 112. The pair of holes 133 which are used will depend on the length of the motorcycle. Rear brace 150 is held firmly in this position by the engagement of edges 158 with sidewalls 112. Notably, because of the configuration of sidewalls 154 and the relative angle between platforms 156,157, rear brace 150 will engage a substantial portion of the rear wheel of a loaded motorcycle, thereby providing lateral support as well as restricting rolling. It will be appreciated that rear brace 150 will cup rear wheels of motorcycles of varying lengths equally well because of the lateral adjustability of placement along platform 110.

Figure 3:
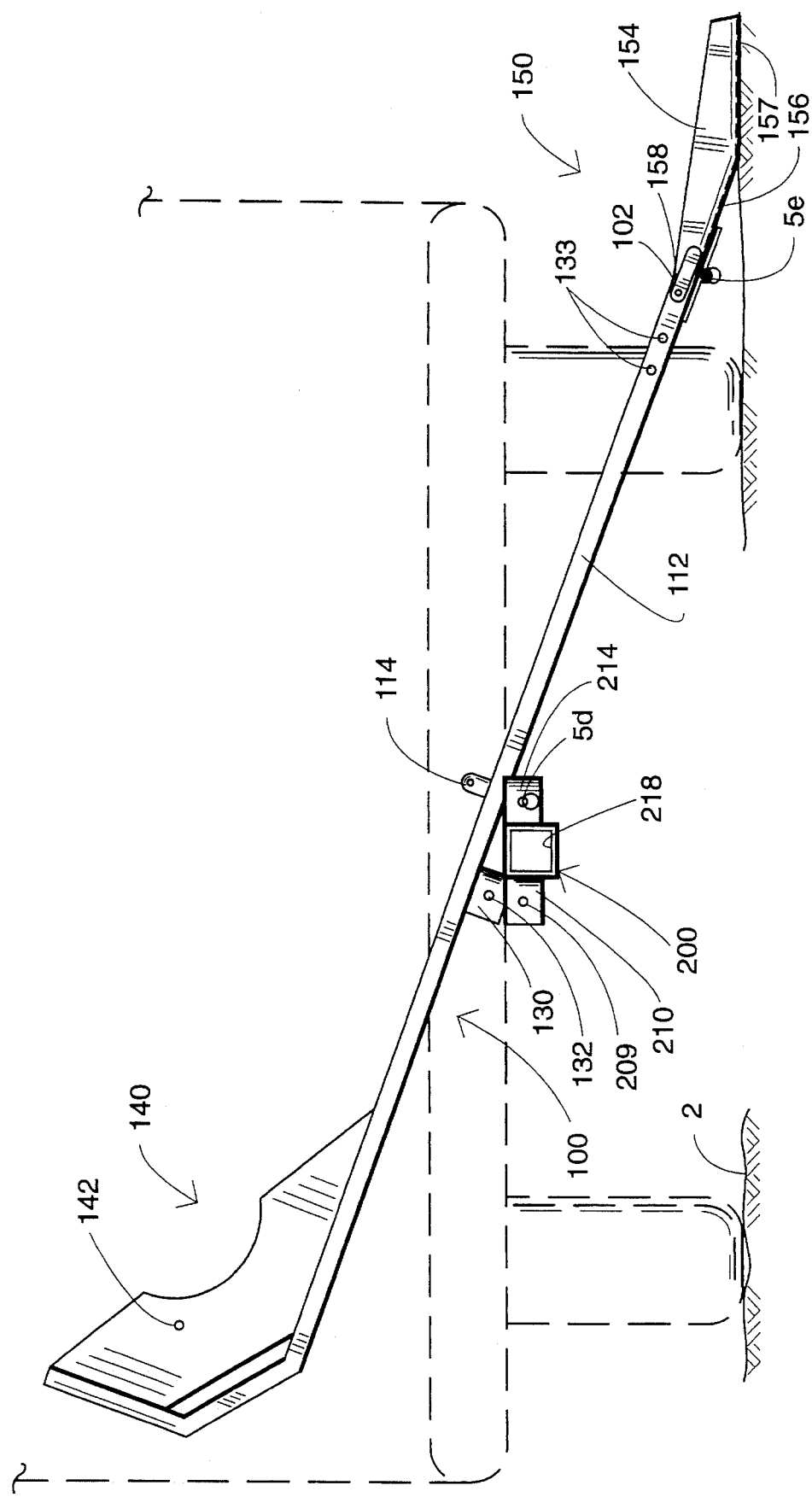
FIG. 3 is a side elevational view of the motorcycle carrier of the present invention shown mounted on a vehicle, the vehicle being shown in dashed lines, in a loading position.

Rear brace 150 will serve as a ramp when mounted in the loading position as shown in FIG. 3. Rear brace 150 is mounted in the loading position by positioning sleeve 160 between sleeves 134 and inserting lock pin 5e through all three sleeves. Flange 162 will then be disposed adjacent the underside of platform 110. Platform 110 and rear brace 150 are braced from rotating relative to one another in either direction by edges 158, which mate with edges 102, and tab 162 which engages the underside of platform 110.

In a first, transporting position, shown in FIG. 2, ramp assembly 100 is mounted on pivot mount 200 by placing platform 110 above tube 216 such that U-shaped bracket 130 is disposed within U-shaped bracket 210. Lock pin 5d is inserted through sleeve 122 and holes 213 and a pin 5c is inserted through holes 132,209. It will be understood that when ramp assembly 100 is mounted in this manner, lock pins 5c,5d will secure platform 110 so that it will not rotate about first lock pin 5d. Preferably, platform 110 is supported by the lock pins 5c,5d and rests directly on the top surface of tube 216.

When ramp assembly 100 is in a second, loading position, shown in FIG. 3, a motorcycle may be loaded or unloaded from carrier 10. Ramp assembly 100 may be placed in this position by removing second lock pin 5c which secures U-shaped bracket 130 within U-shaped bracket 210. Platform 110 may then be rotated about first lock pin 5d which secures sleeve 122 between tabs 214. When placed in this position with rear brace 150 in the loading position, platform 110 and first platform 156 of rear brace 150 form a continuous ramp of substantially uniform slope, and second platform 157 lies on the ground 2.

Notably, ramp assembly 100 is supported at or near the middle of the length of platform 110. As a result, ramp assembly 100 is substantially balanced. It will be appreciated that such an arrangement is advantageous when loading and unloading a motorcycle because the force required to rotate ramp assembly 100 is minimized. This is especially important when a user is returning a loaded ramp assembly 100 to the transporting position because the motorcycle will be relatively heavy, on the order of 200 to 350 lbs. Furthermore, the nearer the axis of pivot is to the second end of platform 110, the greater the angle that the platform must be rotated in order to load the motorcycle, which requires the user to roll the motorcycle up a steeper slope. Preferably, holes 132 and sleeve 122 are in the range of 5 to 7 inches from one another.

As previously discussed, a motorcycle may be secured on motorcycle carrier 10 by means of front brace 140 and rear brace 150. In addition, apertured tabs 114 are mounted on sidewalls 112 for attaching a strap or cord 3 for holding a motorcycle in place. It will be appreciated that apertured tabs 114 may be replaced with any suitable securing means, such as S-shaped hooks. Stabilizer 500, shown in FIG. 1, is provided for reducing the motion of a mounted motorcycle while it is in transit, particularly the vertical motion due to compression and expansion of the motorcycle's shock absorbers. Stabilizer 500 further includes a mounting tube 514 which is designed to be inserted into hitch mount 300. Holes 515 are formed in the end of leg 514. Connecting tube 512 extends upwardly from mounting leg 514. Support tube 510 extends outwardly from the end of connecting tube 512 opposite mounting leg 514 such that the three legs together form a U-shaped tube. Stabilizer 500 is mounted onto ramp assembly 100 by inserting mounting tube 514 into hitch mount 300, aligning holes 217,219 and holes 320,321 with holes 515 and inserting lock pin 5f through the aligned holes. When stabilizer 500 is so mounted, support tube 510 underlies and supports a rigid portion of the motorcycle, for example, the lower frame or bump guard. Preferably, support tube 510 is covered with rubber or similar material to avoid scratching the motorcycle.

As noted hereinabove, carrier 10 may be mounted for loading and unloading from either side of the vehicle. Because pivot mount 200 is longitudinally symmetric, it may be rotated 180° about the vertical axis and slid over hitch mount 300. Pivot mount 200 is then secured to hitch mount 300 by inserting lock pin 5b through holes 217,219, 320,321. Similarly, stabilizer 500 may be mounted by inserting mounting tube 514 into hitch mount 300 and inserting lock pin 5f through holes 515, holes 340,341 and holes 211,215.

Because the direction of the ramp assembly itself may be reversed, a rigid and integrated front brace like front brace 140 may be utilized. It will be appreciated that all elements of carrier 10 will function the same, regardless of whether it is mounted for loading and unloading from one side or the other.

It will be appreciated that the relative detachability of hitch 400, hitch mount 300, pivot mount 200, ramp assembly 100, rear brace 150, the lock pins, and stabilizer 500 provides certain advantages in storing motorcycle carrier 10 and in adapting the same to varying needs. Because the carrier may be broken down into several smaller components, all of which are relatively narrow, it may fitted into smaller and more convenient spaces than most conventional carriers. If a particular vehicle requires that ramp assembly 100 extend farther out from or nearer to the hitch, a longer or shorter hitch mount 300 may be substituted without modifying the remaining components. Likewise, stabilizers of varying sizes may be substituted for use with motorcycles of different sizes. It should be noted, however, that if a strap having an adjustable tightening means, such as a winch, is employed, a stabilizer of a given size may be used with a wide range of motorcycles.

It will be readily appreciated that any coupling capable of performing the functions performed by the lock pins of the preferred embodiment may be used in their place. To provide for the degrees of break-down noted above, it is preferable that such couplings be removable. Lock pins are implemented in the preferred embodiment because they have the added advantages of being readily available and relatively inexpensive.

Certain modifications and improvements will occur to those skilled in the art upon a reading of the foregoing description. It should be understood that all such modifications and improvements are properly within the scope of the invention.

I claim:

1. A motorcycle carrier for carrying a motorcycle on a vehicle having a hitch, comprising:

a. a hitch mount having a first end and a second end, said first end detachably securable to the hitch of the vehicle;

b. a pivot mount detachably mounted on said second end of said hitch mount, said pivot mount including a first hinge element extending from said pivot mount and a first brace element extending from said pivot mount;

c. a ramp assembly tier supporting the motorcycle, said ramp assembly including a second hinge element, a second brace clement and a platform, said platform having a first end and a second end and extending continuously from said first end to said second end and being configured to receive and support the wheels of the motorcycle;

d. a first coupling arranged and configured to pivotally couple said first hinge element and said second hinge element;

e. a second coupling arranged and configured to couple said first brace element and said second brace element, said second coupling being removable;

f. wherein, when said second coupling is removed, said ramp assembly is rotatable about said first coupling between a transporting position and a loading position; and g. wherein said pivot mount may be removed from said hitch mount, rotated 180°, and remounted on said hitch mount so that said pivot mount and said ramp assembly may be selectively mounted with respect to the vehicle for selectively loading and unloading a motorcycle from either side of the vehicle.

2. A motorcycle carrier for carrying a motorcycle on a vehicle having a hitch, comprising:

a. a support arm for mounting said motorcycle carrier on the hitch of the vehicle and including a first hinge element;

b. a ramp assembly for supporting the motorcycle and including a second hinge element;

c. a coupling arranged and configured to pivotally couple said first hinge element and said second hinge element;

d. a rigid stabilizer bar detachably secured to the motorcycle carrier, a portion of said stabilizer bar underlying the motorcycle, said stabilizer bar extending vertically from said ramp assembly and arranged and configured to restrict downward movement of the motorcycle; and e. wherein said stabilizer bar comprises first, second, and third bar members rigidly interconnected in a substantially C-shape, and wherein said first bar member is arranged and configured to detachably engage said support arm such that said stabilizer bar is restricted from rotational movement about said support arm, said third bar member is arranged and configured to engage the underside of said motorcycle, and said second bar member extends substantially vertically between said first and third bar members.

3. A motorcycle carrier for carrying a motorcycle on a vehicle having a hitch, comprising:

a. a hitch mount having a first end and a second end, said first end detachably securable to the hitch of the vehicle;

b. a pivot mount detachably mounted on said second end of said hitch mount, said pivot mount including a first hinge element extending from said pivot mount and a first brace element extending from said pivot mount;

c. a ramp assembly for supporting the motorcycle, said ramp assembly including a second hinge element, a second brace element, and a platform having a first end and a second end and extending continuously from said first end to said second end and being configured to receive and support the wheels of the motorcycle;

d. a first coupling arranged and configured to pivotally couple said first hinge element and said second hinge element;

e. a second coupling arranged and configured to couple said first brace element and said second brace element, said second coupling being removable;

f. wherein, when said second coupling is removed, said ramp assembly is rotatable about said first coupling between a transporting position and a loading position;

g. a stabilizer bar, said stabilizer bar being detachably secured to said support arm and configured such that when a motorcycle is transported on the carrier, said stabilizer bar restricts any downward movement of the motorcycle during transport; and h. wherein said pivot mount includes a tube adapted to receive said second end of said hitch mount, wherein said first hinge element extends horizontally from a first side of said tube, and said first brace element extends horizontally from the opposite side of said tube and wherein said first coupling provides a pivot axis substantially parallel to the length of said tube.

4. The motorcycle carrier of claim 3 wherein said pivot mount includes a to be adapted to receive said second end of said hitch mount, wherein said first hinge element extends horizontally from a first side of said tube, and said first brace element extends horizontally from the opposite side of said tube and wherein said first coupling provides a pivot axis substantially parallel to the length of said tube.

5. The motorcycle carrier of claim 3 wherein the distance between said first and second couplings is in the range of about five inches to about seven inches.

6. The motorcycle carrier of claim 3 wherein said stabilizer bar comprises first, second, and third bar members rigidly interconnected in a substantially C-shape, and wherein said first bar member is arranged and configured to detachably engage said tube of said pivot mount such that said stabilizer bar is restricted from rotational movement about said pivot mount, said third bar member is arranged and configured to engage the underside of said motorcycle, and said second bar member extends substantially vertically between said first and third bar members.

7. A motorcycle carrier for carrying a motorcycle on a vehicle having a hitch, comprising:

a. a hitch mount having a first end and a second end, said first end detachably securable to the hitch of the vehicle;

b. pivot mount detachably mourned on said second end of said hitch mount, said pivot mount including a first hinge element extending from said pivot mount and a first brace element extending from said pivot mount;

c. a ramp assembly for supporting the motorcycle, said ramp assembly including a second hinge element, a second brace element and a platform, said platform having a first end and a second end and extending continuously from said first end to said second end and being configured to receive and support the wheels of the motorcycle;

d. first coupling arranged and configured to pivotally couple said first hinge element and said second hinge element;

e. a second coupling .arranged and configured to couple said first brace element and said second brace element, said second coupling being removable;

f. wherein when said second coupling is removed, said ramp assembly is rotatable about said first coupling between a transporting position and a loading position; and g. wherein said pivot mount includes a tube adapted to receive said second end of said hitch mount, wherein said first hinge element extends horizontally from a first side of said tube and said first brace element extends horizontally from the opposite side of said tube, and wherein said first coupling provides a pivot axis substantially parallel to the length of said tube.

8. The motorcycle carrier of claim 7 wherein the distance between said first and second couplings is in the range of about five inches to about seven inches.

9. A motorcycle carrier for carrying a motorcycle on a vehicle having a hitch, comprising:

a. a hitch mount having a first end and a second end, said first end detachably securable to the hitch of the vehicle;

b. a pivot mount detachably mounted on said second end of said hitch mount, said pivot mount including a tube adapted to receive said second end of said hitch mount, a first hinge element extending horizontally from a first side of said tube, and a first brace element extending horizontally from the opposite side of said of tube:

c. a ramp assembly for supporting the motorcycle, said ramp assembly including a second hinge element, a second brace element, and a platform having a first end and a second end and extending continuously from said first end to said second end and being configured to receive and support the wheels of the motorcycle;

d. a first removable coupling arranged and configured to pivotally couple said first hinge element and said second hinge element;

e. a second removable coupling arranged and configured to couple said first brace element and said second brace element;

f. wherein said ramp assembly is supported solely by said hitch mount, said pivot mount, and said first and second couplings, and said pivot mount is disposed approximately underneath the middle of said platform;

g. wherein, when said second coupling is removed, said ramp assembly is rotatable about said first coupling between a transporting position and a loading position, said first coupling providing a pivot axis substantially parallel to the length of said tube;

h. wherein said pivot mount may be removed from said hitch mount, rotated 180°, and remounted on said hitch mount so that said pivot mount and said ramp assembly may be selectively mounted with respect to the vehicle for selectively loading and unloading a motorcycle from either side of the vehicle;

i. wherein the distance between said first and second couplings is in the range of about five inches to about seven inches; and j. a rigid stabilizer bar detachably secured to the motorcycle carrier and arranged and configured to restrict downward movement of the motorcycle, said stabilizer bar comprising first, second, and third bar members rigidly interconnected in a substantially C-shape, and wherein said first bar member is arranged and configured to detachably engage said tube of said pivot mount such that said stabilizer bar is restricted from rotational movement about said pivot mount, said third bar member is arranged and configured to engage the underside of said motorcycle, and said second bar member extends substantially vertically between said first and third bar members.

10. The motorcycle carrier of claim 9 wherein said ramp assembly further includes a front brace mounted at said first end of said platform, said front brace capable of receiving at least a portion of the front wheel of the motorcycle and including a cut-out portion for receiving brake components of the motorcycle, and a rear brace detachably mounted on said second end of said platform, said rear brace including a first platform and a second platform and being selectively positionable between a loading position and a transporting position, said rear brace selectively positionable on said platform relative to said first end and said second end of said platform when in the transporting position such that said rear brace may engage and support motorcycles of different lengths, each of said first and second platforms of said rear brace having a pair of side walls which serve to brace the rear wheel when said rear brace is in the transporting position, and wherein when said platform is in said loading position and said rear brace is in said loading position, said platform and said first platform have substantially the same slope and said second platform lays adjacent the ground and said rear brace is held substantially rigid with respect to said platform by said first pair of side walls of said first platform.

* * * * *